(12) United States Patent
Mueller

(10) Patent No.: US 12,404,890 B2
(45) Date of Patent: Sep. 2, 2025

(54) ELONGATED MEMBER CONNECTOR

(71) Applicant: Steven Mueller, Clearwater, FL (US)

(72) Inventor: Steven Mueller, Clearwater, FL (US)

(73) Assignee: System Enterprises, LLC, Clearwater, FL (US)

( * ) Notice: Subject to any disclaimer, the term of this patent is extended or adjusted under 35 U.S.C. 154(b) by 241 days.

(21) Appl. No.: 18/312,628

(22) Filed: May 5, 2023

(65) Prior Publication Data

US 2024/0369088 A1    Nov. 7, 2024

(51) Int. Cl.
*F16B 7/04*    (2006.01)

(52) U.S. Cl.
CPC .............. *F16B 7/048* (2013.01); *F16B 7/044* (2013.01)

(58) Field of Classification Search
CPC ........ F16B 7/044; F16B 7/048; F16B 7/0486; F16B 7/0493; F16B 7/185; F16B 21/02; F16B 7/1472
USPC ....... 403/170, 171, 172, 173, 174, 175, 176, 403/178, 323, 324
See application file for complete search history.

(56) References Cited

U.S. PATENT DOCUMENTS

| | | | | |
|---|---|---|---|---|
| 2,474,727 A * | 6/1949 | Denier | ...................... | F16B 7/18 403/340 |
| 2,879,087 A * | 3/1959 | Haglund | ................... | E04G 7/14 D8/382 |
| 2,970,798 A * | 2/1961 | Friotchle | ................. | F16B 2/065 248/124.2 |
| 3,804,542 A * | 4/1974 | Hammerschmidt | ...... | F16B 7/18 403/264 |
| 4,294,561 A * | 10/1981 | Chapman | .............. | F16B 7/0486 403/219 |
| 4,998,841 A * | 3/1991 | Wilde | ..................... | F16B 7/044 403/395 |
| 6,565,279 B1 * | 5/2003 | Skovronski | ............. | F16B 2/065 403/231 |
| 6,896,437 B2 * | 5/2005 | Morgan | ................ | F16B 7/0446 135/909 |
| 7,665,699 B2 * | 2/2010 | Oddsen, Jr. | ............... | F16B 2/10 248/220.21 |
| 9,638,402 B2 * | 5/2017 | Paradiso | ............... | F16B 35/005 |
| 10,422,155 B2 * | 9/2019 | Goedecke | .......... | E04H 17/1417 |
| 10,816,108 B2 * | 10/2020 | Ohnemus | ............... | A62C 35/68 |
| 11,168,812 B1 * | 11/2021 | Wedding | ................. | F16L 3/085 |
| 11,215,209 B2 * | 1/2022 | Ramey | .................... | A01G 9/247 |
| 11,317,600 B2 * | 5/2022 | Huthmaker | ............... | F16B 9/07 |
| 11,333,181 B2 * | 5/2022 | Stewart | ................... | F16L 3/1218 |
| 11,879,584 B1 * | 1/2024 | Wedding | ............. | F16L 55/1141 |
| 11,997,986 B2 * | 6/2024 | Mravca | ................ | F16M 13/022 |
| 12,031,568 B2 * | 7/2024 | Quinn | .................... | A63B 17/04 |
| 12,188,590 B2 * | 1/2025 | Hackett | ................... | A62C 31/28 |
| 2009/0103976 A1 * | 4/2009 | Chiang | .................... | F16B 7/044 411/76 |

(Continued)

*Primary Examiner* — Jeffrey O'Brien
(74) *Attorney, Agent, or Firm* — Lewellyn Law, PLLC; Stephen Lewellyn

(57) ABSTRACT

A connector for connecting elongated members has a connector body having two configurations. In a first configuration, the connector connects two elongated members in a fixed relative position. In a second configuration, the connector connects the two elongated members by selectively positioning one elongated member relative to a second elongated member. A threaded lock is provided that is operated to configure the connector in one of the two configurations.

7 Claims, 5 Drawing Sheets

(56) References Cited

U.S. PATENT DOCUMENTS

| | | | |
|---|---|---|---|
| 2009/0294215 A1* | 12/2009 | Vos | F16B 7/0493 |
| | | | 182/222 |
| 2013/0045042 A1* | 2/2013 | Ohlson | E04B 1/585 |
| | | | 403/171 |
| 2016/0376811 A1* | 12/2016 | Eberhart | E04H 17/1448 |
| | | | 403/171 |
| 2018/0010624 A1* | 1/2018 | Schlitter | A47B 13/083 |
| 2020/0170217 A1* | 6/2020 | Earls | F16B 7/0493 |
| 2022/0307532 A1* | 9/2022 | Lu | F16M 11/10 |
| 2023/0019030 A1* | 1/2023 | Luo | F16B 7/0446 |
| 2024/0151328 A1* | 5/2024 | Anderson | F16L 3/243 |

* cited by examiner

ELONGATED MEMBER CONNECTOR

FIELD OF THE INVENTION

The present disclosure relates to elongated member connectors and, more particularly, to an elongated connector that can selectively position an elongated member relative to the length of another elongated member.

BACKGROUND OF THE INVENTION

Connectors or couplers for connecting elongated members are known. For example, Published U.S. Patent Application No. 2016/0376811 describes a connector for securing elongated rail members together to form an assembled structure. Other connectors for connecting elongated members are described in U.S. Published US Patent Application No. 2009/0103976, and U.S. Pat. No. 11,319,975.

While these and other existing connectors for connecting elongated members serve their respective objectives, a need remains for a new connector for connecting elongated members that allows for the selective positioning of one elongated member relative to a second elongated member and also allows for a fixed, non-selective position of the one elongated member relative to the second elongated member.

SUMMARY OF THE INVENTION

Embodiments of the invention provide a connector for connecting elongated members that permit the selective positioning of one elongated member relative to a second elongated member.

Embodiments of the invention further provide a connector for connecting elongated members that has two operating configurations. In the first configuration, two elongated members are connected in a fixed relative relation, and in the second configuration, one elongated member may be selectively positioned related to the other elongated member. In other words, in the first configuration, the connector is configured like an elbow connector, and in the second configuration, the connector can slide up and down one of the elongated members.

Embodiments of the invention further provide a connector for connecting elongated members of the frame elements of game net frames that are used to hold a game net.

Numerous additional objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature or a feature with similar functionality. In the drawings.

DETAILED DESCRIPTION

Figure 1:
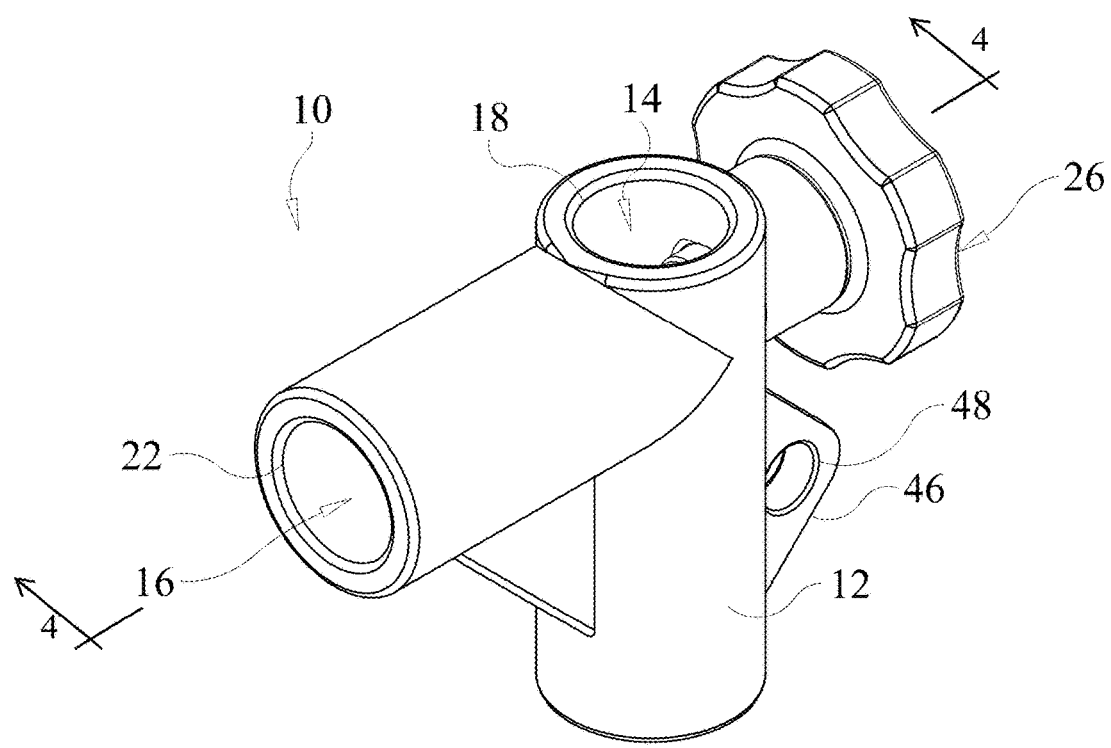
FIG. 1 is a first perspective view of an elongated member connector that is constructed in accordance with the principles of an embodiment of the invention.
Figure 2:
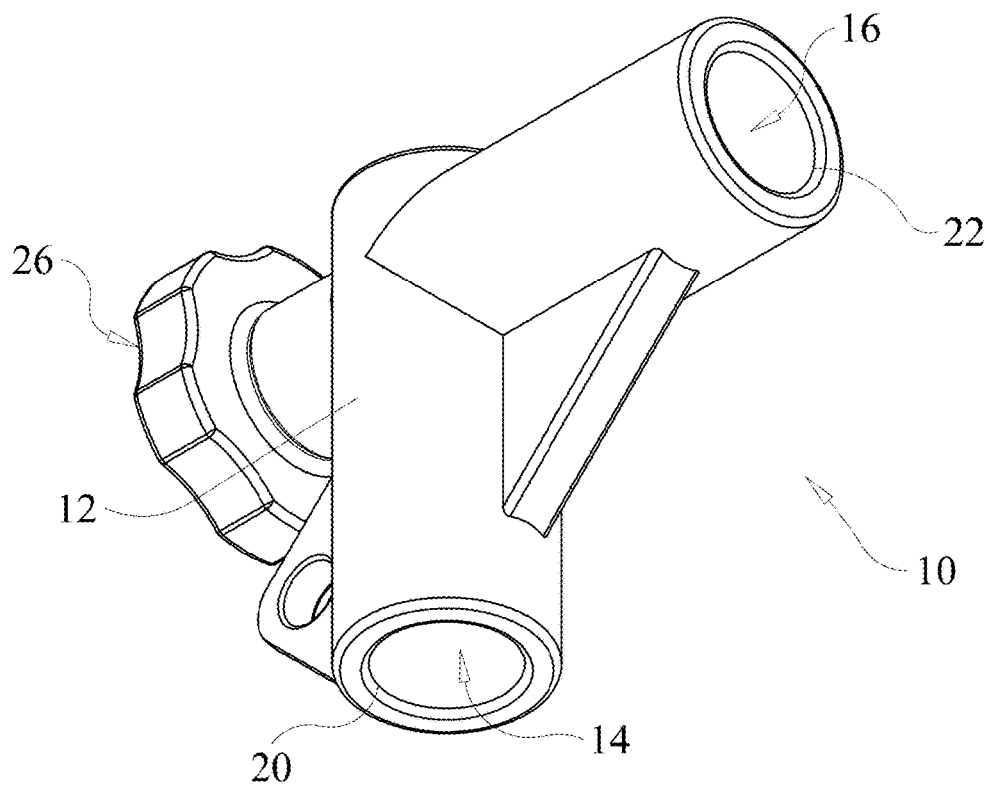
FIG. 2 is a second perspective view of an elongated member connector that is constructed in accordance with the principles of an embodiment of the invention.
Figure 3:
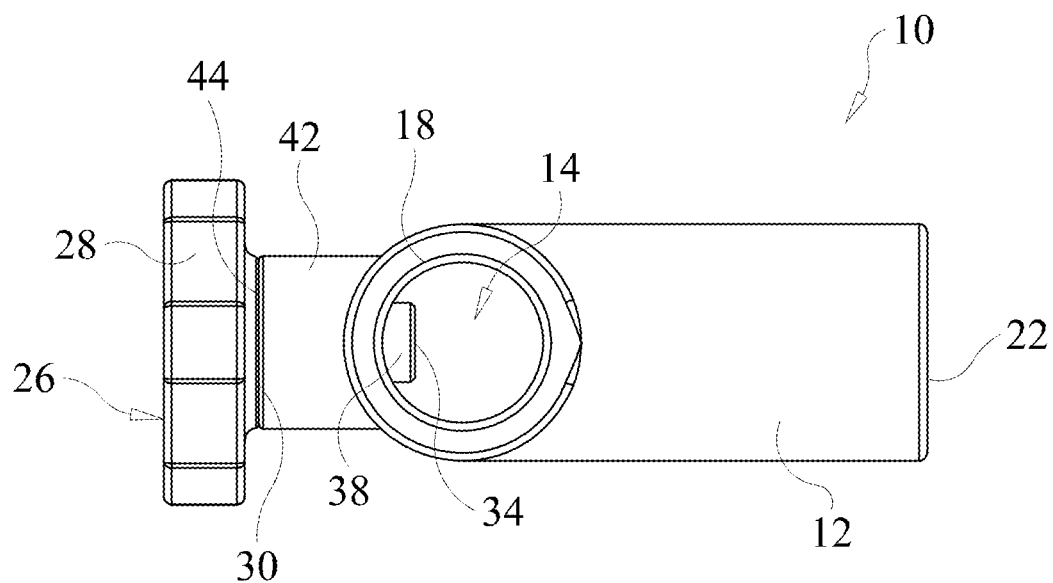
FIG. 3 is a top view of an elongated member connector that is constructed in accordance with the principles of an embodiment of the invention.
Figure 4:
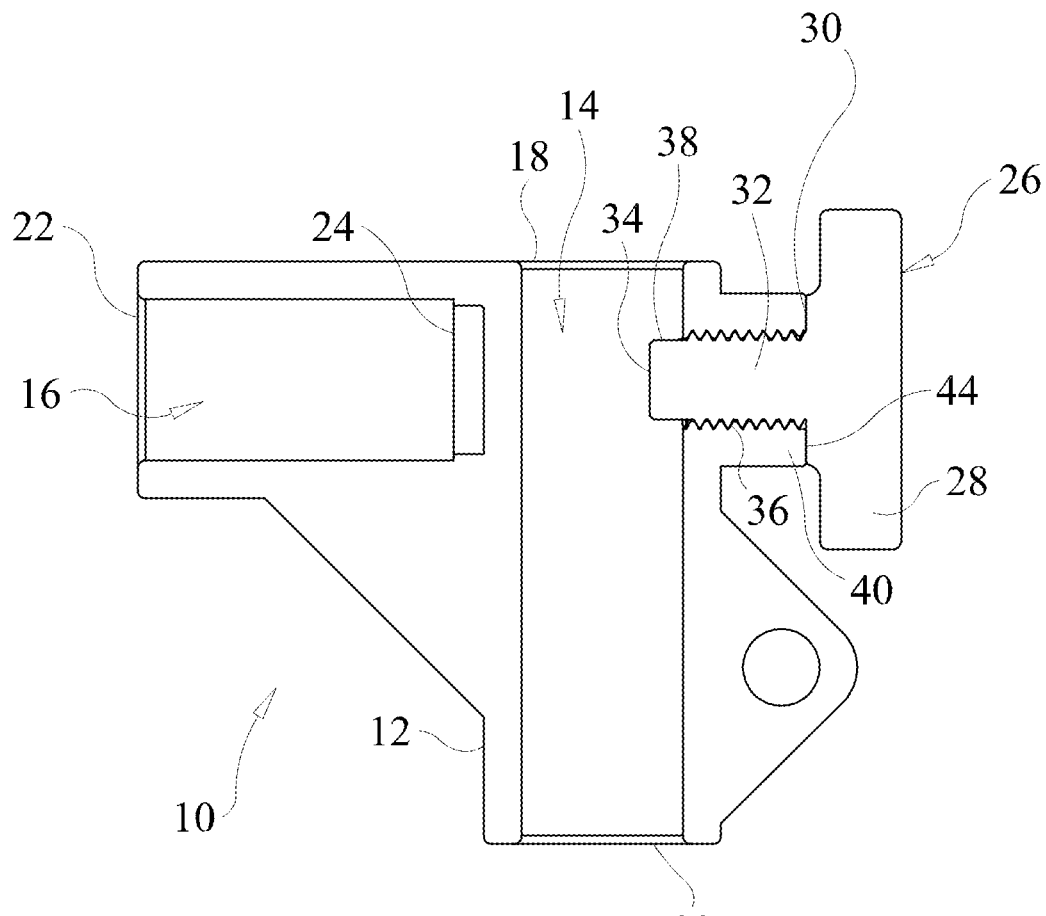
FIG. 4 is a cross-sectional view taken along line 4-4 in FIG. 1.
Figure 5:
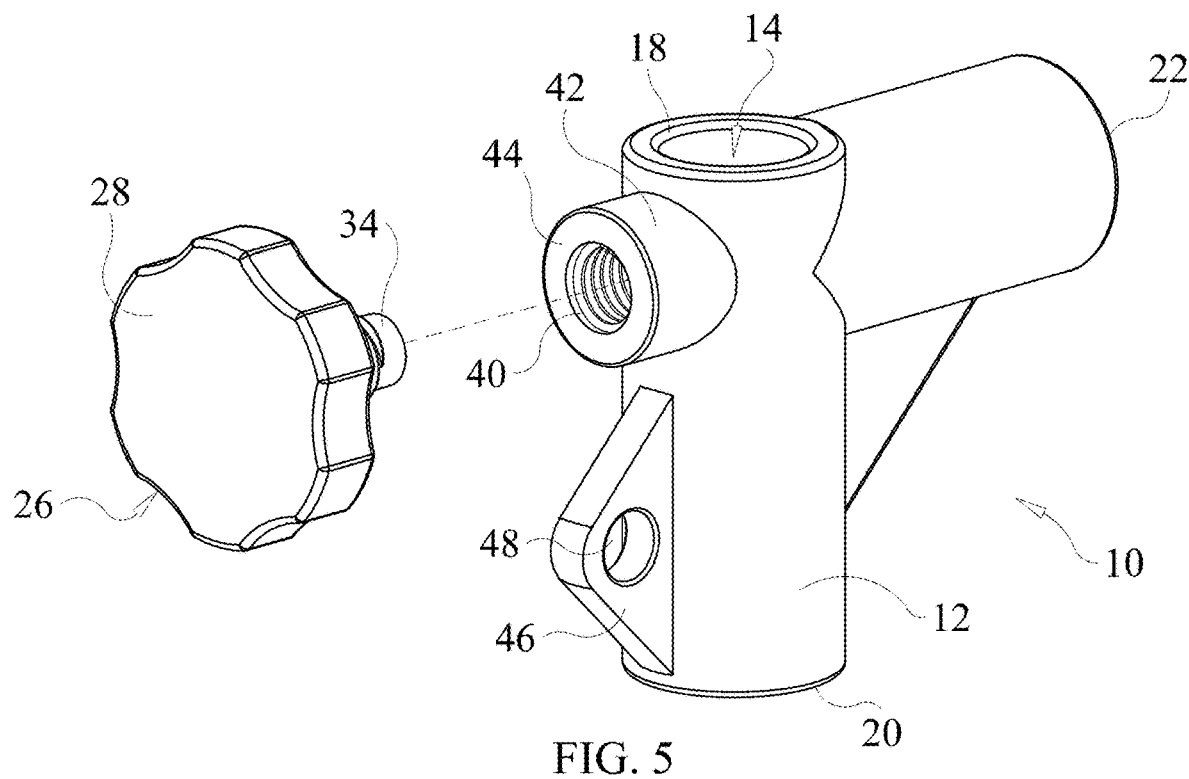
FIG. 5 is an exploded perspective view of an elongated member connector that is constructed in accordance with the principles of an embodiment of the invention.

The following detailed description of embodiments of the invention references the accompanying drawings. The embodiments are intended to describe aspects of the invention in sufficient detail to enable those skilled in the art to practice the invention.

Turning now to FIGS. 1-5 of the drawings, an elongated member connector 10 that is constructed in accordance with an embodiment of the invention is illustrated. Connector 10 has a body 12 that is configured to connect two elongated members (not shown). As representatively shown, body 12 is configured to connect two elongated members at a generally 90-degree angle to one another. The connector body 12 can be formed as an integral one piece from a plastic material. As further discussed herein, the elongated members could be elements of a frame that is used to support a game net. It is important to note the elongated members do not need to be hollow tube-like members. Rather, the elongated members could be a solid rod, a rail, a pipe, post, or a tubular member, for example.

As representatively shown, body 12 has first and second passages 14 and 16 that are arranged transversely to one another and can be at a 90-degree angle relative to one another. As further representatively shown, the first and second passages 14 and 16 are cylindrical and configured to receive a cylindrically shaped elongated member. However, it should be noted that the first and second passages 14 and 16 could have different cross-sectional geometries that correspond to different shapes of elongated members. As a nonlimiting example, the first and second passages 14 and 16 could be square shaped in cross-section to accommodate similarly square shaped elongated members.

The first passage 14 is open at opposite ends 18 and 20 and is configured to slidingly receive a first elongate member such that the body 12 is slidable along a length of the elongated member. The second passage 16 is open at end 22 and is configured to receive a second elongated member. The second passage 20 can be a blind bore such that the insertion depth of the second elongated member may be limited by end wall 24.

The connector 10 further includes a lock 26. As representatively shown, lock 26 has a hand knob 28 having a stop surface 30 and a shaft 32. Shaft 32 extends outwardly from the stop surface 30 and that terminates at free end 34. Shaft 32 has a threaded section 36 and a non-threaded stub section 38 that is located at the free end. The shaft 32 is received by a threaded bore 40 of the body 12 with the threaded section 36 threadedly engaged with the threads of the threaded bore. The threaded bore 40 can at least be partially formed through boss 42 of body and the threaded bore extends through the body and is open to the first passage 14.

Rotating the knob 28 in a first direction advances the shaft 32 inwardly causing the non-threaded stub section 38 to extend out of the threaded bore and transversely into the first passage 14. Rotating the knob 28 in a second direction opposite of the first rotational direction causes the shaft to move outwardly and withdraws the non-threaded stub section 38 from the first passage.

Continued rotation in the first direction causes the stop surface 30 to abut against the body 12, and as representatively shown, abut against surface 44 of the boss 42 to prevent any portion of the threaded section 36 from extending out of the threaded bore and into the first passage 14. In an aspect, the distance between stop surface 30 and the position where the threaded section 36 transitions to the non-threaded stub section 38 is equal to or less than the length of the threaded bore 40. As explained in more detail below, this full stop position prevents the threads of the threaded section 36 from being damaged by an elongated member disposed in the first passage.

The body 12 may further have a flange 46 extending therefrom and a hole 48 through the flange. The hole 48 can be used to attach a tie rope or guy wire in certain applications, such as, for example when the connector is used in the assembly of a net frame and the tie rope is used to help secure the net frame.

Figure 6:
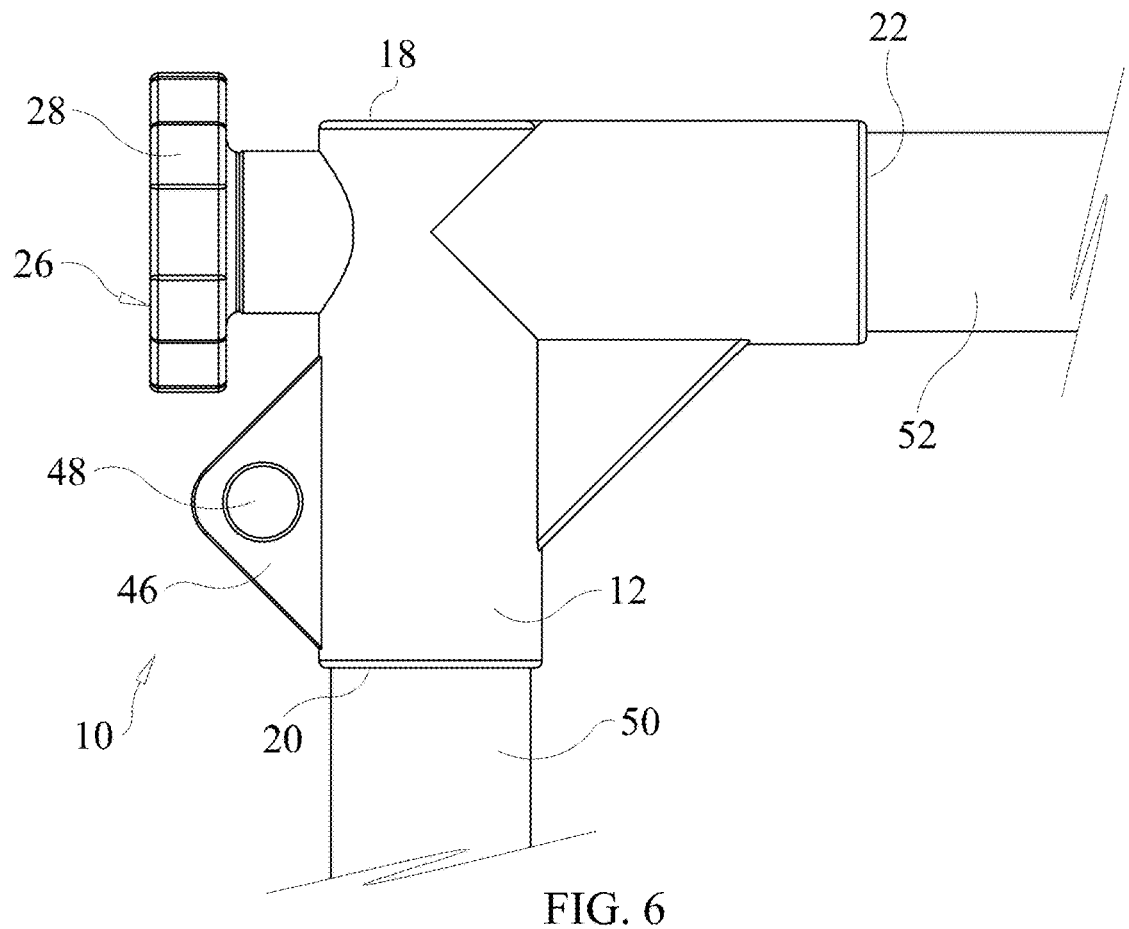
FIG. 6 is a side view of an elongated member connector that is constructed in accordance with the principles of an embodiment of the invention, shown connecting two elongated members.

In FIG. 6 the connector 10 is shown with a first elongated member 50 received by the first passage 14 and a second elongated member 52 received by the second passage 16, thereby connecting the first and second elongated members.

Figure 7:
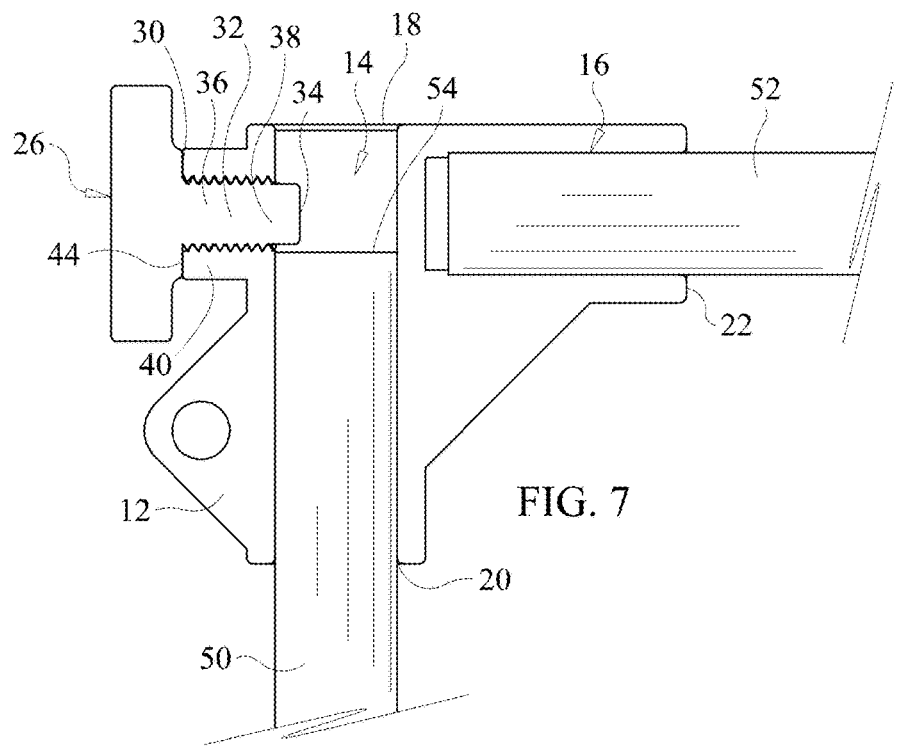
FIG. 7 is a side cross-sectional view of an elongated member connector that is constructed in accordance with the principles of an embodiment of the invention, shown connecting two elongated members and with the connector in a first configuration.

In FIG. 7 the connector 10 is shown in cross-section and in a first configuration with the first and second elongated members 50 and 52 received by the first and second passages 14 and 16, respectively. Further shown is the lock 26 rotated into the full stop position with the stop surface 30 of the lock abutting against surface 44 of the body 12. In this position, the non-threaded stub section 38 of shaft 32 extends into the first passage 14 and provides an abutment against end 54 of the first elongated member 50. In such a configuration, the first elongated member 50 is not permitted to extend completely through the first passage 14, thereby positioning the connector 10 at the end of the first elongated member.

As further shown, the full stop position of the lock 26 prevents the threaded section 36 of shaft 32 from extending into the first passage 14 such that the end 54 of the first elongated member cannot contact the threaded section which prevents the end from damaging the threads.

Figure 8:
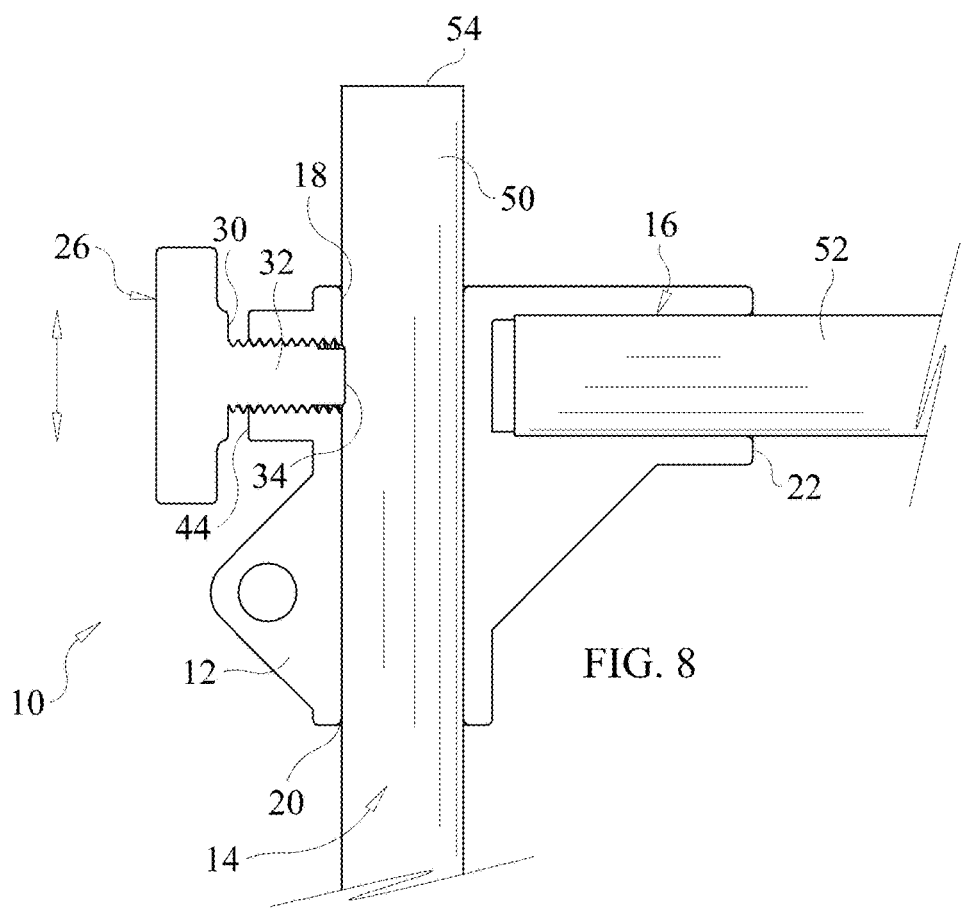
FIG. 8 is a side cross-sectional view of an elongated member connector that is constructed in accordance with the principles of an embodiment of the invention, shown connecting two elongated members and with the connector in a second configuration.

In FIG. 8 the connector 10 is shown in a second configuration. Here, the lock 26 is positioned with the non-threaded stub section 38 of shaft 32 withdrawn from the first passage 14, which allows the body 12 to slide along the length of the first elongated member 50. Sliding the body 12 along the first elongated member 50 also moves the position of the second elongated member 52 relative to first elongated member, thereby adjusting the coupling position between the two members. The position of body 12 along the first elongated member 50 can be selectively retained by rotating the shaft 32 of lock 26 in the first direction to cause the shaft end 34 to abut against the exterior surface of the elongated member and clamp the body to the member.

Figure 9:
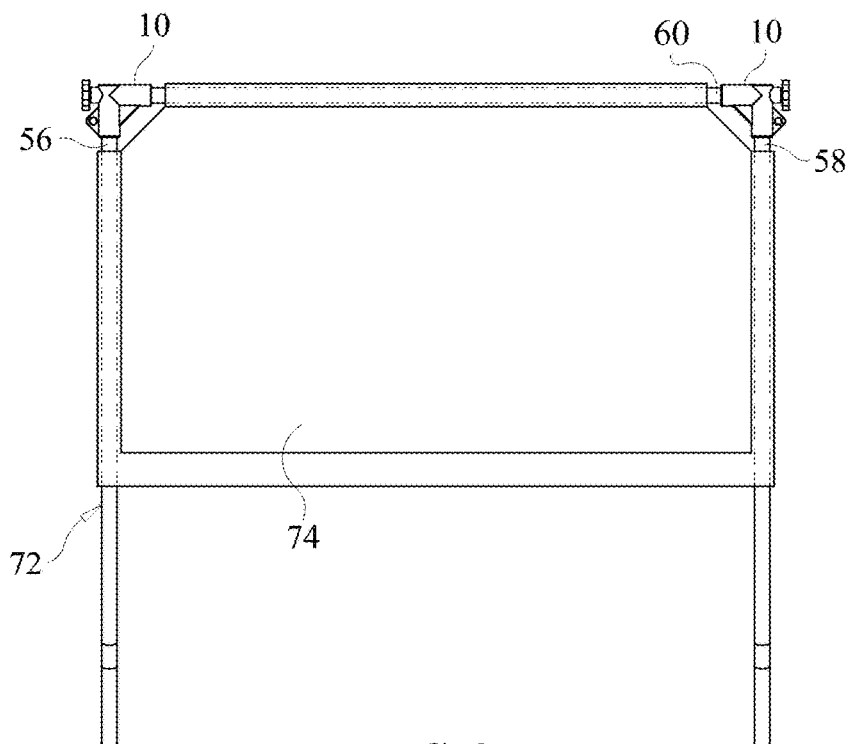
FIG. 9 is an illustration of a game net frame having elongated frame members connected by elongated member connectors that are constructed in accordance with the principles of an embodiment of the invention, showing the elongated member connectors in a first configuration.

In FIG. 9 two connectors 10 are shown in use connecting frame members 56, 58, and 60 of a game net frame 72 upon which a game net 74 is attached. As shown one connector 10 connects vertical member 56 and horizontal member 60, and the other connector 10 connects vertical member 58 and the horizontal member. Here, connectors 10 are in the first configuration as shown in FIG. 7 and explained above, wherein the connectors are positioned at the ends of members 56 and 58.

Figure 10:
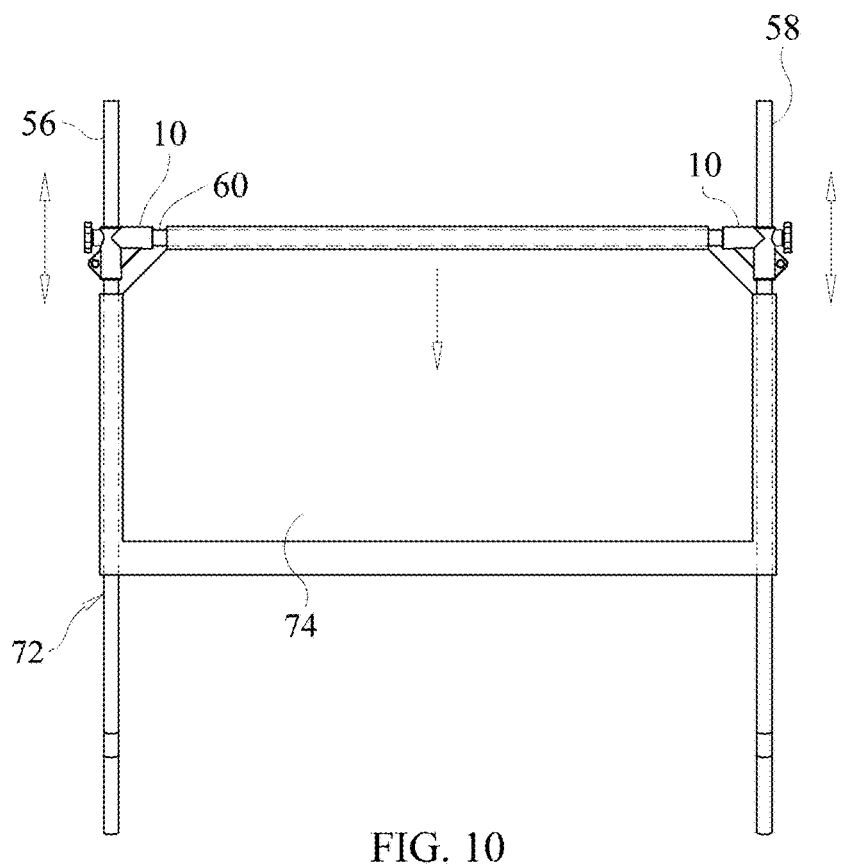
FIG. 10 is an illustration of a game net frame having elongated frame members connected by elongated member connectors that are constructed in accordance with the principles of an embodiment of the invention, showing the elongated member connectors in a second configuration.

In FIG. 10 the game net frame 72 shown in FIG. 9 is further illustrated with the connectors 10 in the second configuration, which is shown in FIG. 8 and explained above. In this configuration, connectors 10 are slid in a direction downward along a length of the vertical members 56 and 58 which also moves the horizontal member 60 downward in relation to the vertical members. With the top edge of the net 74 attached to the horizontal member 60, the height of the net can be adjusted by adjusting the position of connectors 10 along the vertical members 56 and 58.

It will be appreciated by persons skilled in the art that the present embodiment is not limited to what has been particularly shown and described hereinabove. A variety of modifications and variations are possible in view of the above teachings without departing from the scope of the disclosure.

What is claimed is:
1. A connector for joining elongated members, the connector comprising:
    a connector body;

the connector body having a first passage with open opposite ends for receipt of a first elongated member, the first passage configured such that the connector body is slidable along a length of the first elongated member;

the connector body having a second passage with an open end for receipt of an end of a second elongated member;

a lock having a stop surface and a shaft terminating at a free end, the shaft having a threaded section and a non-threaded stub section at the free end, the threaded section of the shaft being threadedly received by a threaded bore of the connector body such that the non-threaded stub section is extended into the first passage by rotating the shaft in a first direction and retraced from the first passage by rotating the shaft in a direction opposite of the first direction; and wherein the threaded section of the shaft is prevented from extending into the first passage by the stop surface abutting against the connector body.

2. The connector of claim 1, wherein the first and second passages are transverse to one another.

3. The connector of claim 1, wherein the first and second passages are arranged at 90-degrees to one another.

4. The connector of claim 1, wherein the lock further comprises a hand knob.

5. The connector of claim 1, wherein the connector body further comprises a flange and a hole through the flange.

6. The connector of claim 1, wherein the first and second passages are cylindrical.

7. The connector of claim 1, wherein the connector body is integrally formed as one piece from a plastic material.

* * * * *